No. 639,594. Patented Dec. 19, 1899.
J. C. MILLER.
CENTRAL DRAFT LAMP.
(Application filed Dec. 9, 1898.)
(No Model.)
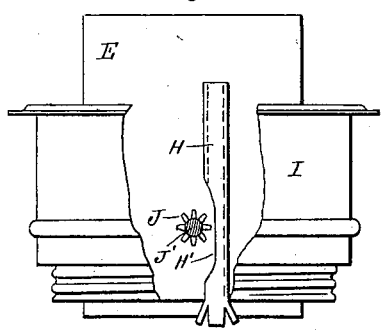
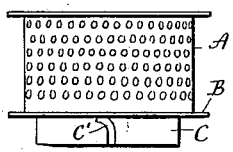
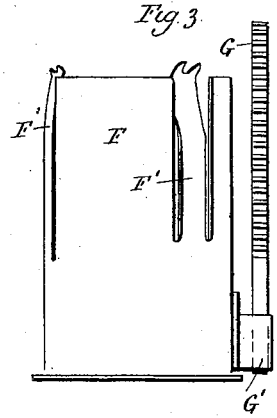
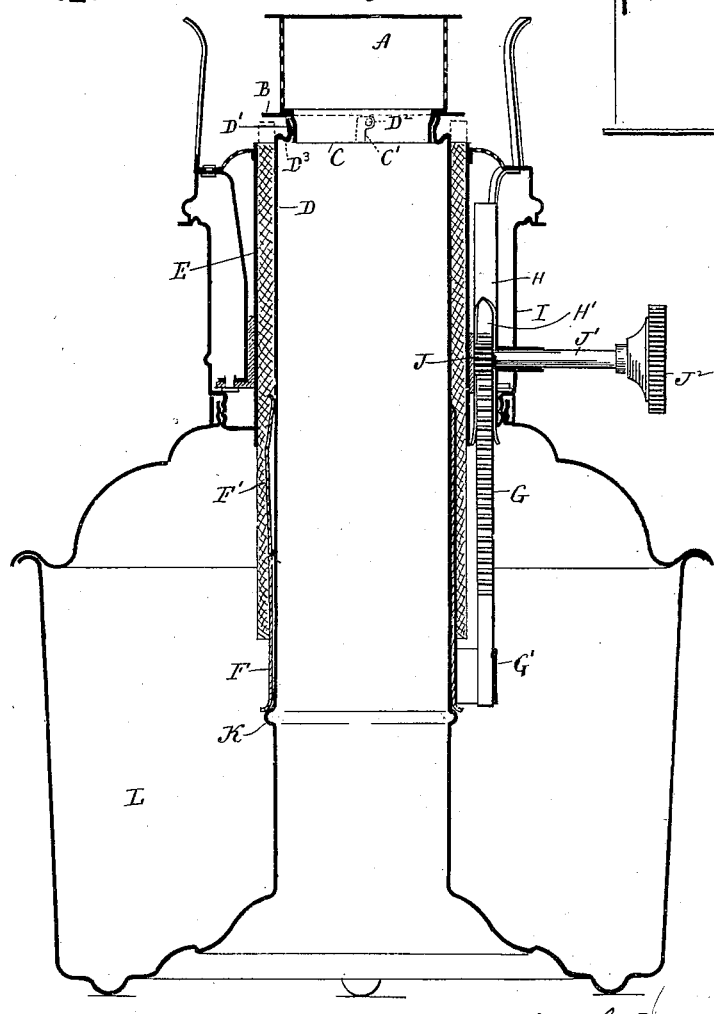
THE NORRIS PETERS CO., PHOTO-LITHO., WASHINGTON, D. C.

UNITED STATES PATENT OFFICE.

JOHN C. MILLER, OF TORRINGTON, CONNECTICUT, ASSIGNOR TO THE MILLER MANUFACTURING COMPANY, OF SAME PLACE.

CENTRAL-DRAFT LAMP.

SPECIFICATION forming part of Letters Patent No. 639,594, dated December 19, 1899.

Application filed December 9, 1898. Serial No. 698,699. (No model.)

*To all whom it may concern:*

Be it known that I, JOHN C. MILLER, of Torrington, in the county of Litchfield and State of Connecticut, have invented a new Improvement in Central-Draft Lamps; and I do hereby declare the following, when taken in connection with the accompanying drawings and the letters of reference marked thereon, to be a full, clear, and exact description of the same, and which said drawings constitute part of this specification, and represent, in—

Figure 1, a view in vertical section of a lamp constructed in accordance with my invention; Fig. 2, a detached view of the burner with a portion of its skirt broken away to show the lifting-bar tube and the ratchet-wheel which extends thereinto; Fig. 3, a detached view, in side elevation, of the wick-band; Fig. 4, a corresponding view of the burner-cone.

My invention relates to an improvement in central-draft lamps, the object being to produce a simple, convenient, and effective lamp constructed with particular reference to preventing its wick from being at any time lifted enough to smoke.

With these ends in view my invention consists in a central-draft lamp furnished with an air-distributer or spreader provided with an annular wick stop-flange and adapted at its lower end to be fastened to the upper end of a central draft-tube.

My invention further consists in a central draft-tube having a wick-carrier stop located near its lower end.

My invention further consists in certain details of construction and combinations of parts, as will be hereinafter described, and pointed out in the claims.

In carrying out my invention as herein shown I employ an air-distributer or spreader A, which may be of any approved construction, but which, as herein shown, has perforated sides and an imperforate top. This part is provided near its lower end with an annular horizontally-arranged wick stop-flange B, adapted in diameter to extend into the path of the wick, so as to prevent the same from being lifted high enough to cause the lamp to smoke. The said air-distributer or spreader is formed at its lower end with an annular fastening-flange C, smaller than it is in diameter and made integral with it or not, as desired, but, however made, adapting the spreader to be fastened to the upper end of the central draft-tube D, which, as shown, is reduced in diameter at its upper end to form an annular fastening-flange D′, within which the flange C sets. The said flange C is formed with bayonet-joint grooves C′, which receive suitable projections $D^2$, formed in the flange D′. However, I do not limit myself to any particular way for securing the spreader to the central draft-tube, the upper end of which is formed with an annular drip-trough $D^3$, located between the base of the flange D′ and the upper end of the tube proper. In another view of this construction the fastening-flange D′ may be considered as an upward extension of the inner wall of the annular drip-trough $D^3$, formed just within the edge of the extreme upper end of the inner wick or central draft tube D. The outer wick-tube E, which forms a part of the burner proper, is sufficiently cut away at its upper end to provide the required exposure of the upper end of the wick between the wick stop-flange B of the spreader and the upper ends of the inner and outer wick-tubes D and E. It will readily be seen that in case the wick is lifted too high its upper end will impinge against the wick stop-flange, which prevents it from being lifted enough to cause the lamp to smoke. At the same time the upper end of the wick is, as aforesaid, sufficiently exposed to permit the production of the flame required.

This improvement as above described may be used in conjunction with any of the ordinary wick-lifting devices; but I have chosen to show it with an improved wick-lifting device which admirably coöperates with it. The said device comprises a wick-band F, adapted to fit over and ride up and down upon the tube D and formed with a series of wick-gripping jaws F′, which are set so as to normally spring inward within the internal diameter of the band, but which are forced outward for the penetration of their upper ends into the wick when the band is applied to the draft-tube D. The said band is provided with a rack-like lifting-bar G, secured by its lower end to the band through a short arm G', applied thereto, and having its upper end adapted in form and length to extend upward into a bearing-tube H, located within the skirt I of the lamp-burner, this tube being cut away, as at H', to expose the bar for engagement by a ratchet-wheel J, located upon the inner end of a stem J', journaled in the burner, and furnished at its outer end with an ordinary knurled button $J^2$. In order to prevent the wick-band from descending so low upon the draft-tube D as to carry the upper end of the bar G out of range with the ratchet-wheel J, I provide the said tube with a wick-carrier stop, which, as herein shown, consists of an annular bead K, formed by suitably nurling the tube. The location of this stop, however formed, will of course be determined by the length of the bar. An equally important function of the stop K is to prevent the wick-band F, and hence the rack-like lifting-bar G, from dropping down into the fount L too low to permit the upper end of the bar to be registered with and entered into the lower end of the guide-tube H.

This wick-lifting device I do not limit myself to use in connection with the spreader or air-distributer shown and described, or vice versa. I would therefore have it understood that I do not limit myself to the exact construction herein shown, but hold myself at liberty to make such changes and alterations as fairly fall within the spirit and scope of my invention.

Having fully described my invention, what I claim as new, and desire to secure by Letters Patent, is—

1. In a central-draft lamp, the combination with a central draft-tube formed within the edge of its extreme upper end with an annular drip-trough the inner wall of which is extended upward to form an annular fastening-flange, of an air-distributer or spreader provided with a horizontally-arranged wick stop-flange, and adapted to be secured to the said fastening-flange of the tube.

2. In a central-draft lamp, the combination with a central draft-tube formed within the edge of its extreme upper end with an integral, annular drip-trough the inner wall of which is extended upward to form an annular fastening-flange of smaller diameter than the diameter of the tube; of an air-distributer or spreader formed with a horizontally-arranged, annular, wick stop-flange and with a depending flange adapted to fit within the said fastening-flange and be secured thereto.

In testimony whereof I have signed this specification in the presence of two subscribing witnesses.

JOHN C. MILLER.

Witnesses:
 THOMAS W. BRYANT,
 WILLARD A. RORABACK.